Oct. 6, 1970 E. W. O'HANLON 3,532,822

REMOTE CONTROL SYSTEM OPERATED OVER TELEPHONE LINE

Filed May 20, 1968 3 Sheets-Sheet 1

INVENTOR
EDWARD W. O'HANLON
BY
Rudolph J. Jurick
ATTORNEY

INVENTOR
EDWARD W. O'HANLON
BY
Rudolph J. Jurick
ATTORNEY

INVENTOR
EDWARD W. O'HANLON
BY Rudolph J. Jurick
ATTORNEY

1

3,532,822 REMOTE CONTROL SYSTEM OPERATED OVER TELEPHONE LINE

Edward W. O'Hanlon, 644 Country Club Road, Somerville, N.J. 08876

Filed May 20, 1968, Ser. No. 730,338
Int. Cl. H04m *11/00*
U.S. Cl. 179—2 9 Claims

ABSTRACT OF THE DISCLOSURE

A system for controlling the operation of electrical devices located at a receiving station, which system is operable from a remote transmitting station connected to the receiving station by a telephone line. Electrical pulses, introduced into the line upon operation of the telephone ringing circuit, are coupled magnetically to a logic and control circuit. Means are provided to render the system insensitive to electrical noise and to prevent operation of the controlled devices by normal operation of the telephone ringing circuit.

BACKGROUND OF THE INVENTION

Various systems have heretofore been proposed to effect a control function over a conventional telephone line. The prior systems, however, suffer from numerous shortcomings. For example, certain prior systems require modification of the telephone line, which is objectionable as such modification can interfere with the normal operation of the line. Other systems function upon the transmission of a predetermined number of ringing pulses and, therefore, may be operated by unauthorized personnel upon a fortuitous transmission of the number of pulses for which the particular system has been designed. Furthermore, most prior systems are susceptible to spurious operation by electrical or audio noise.

A control system made in accordance with this invention overcomes the shortcomings of prior systems and may be used by any telephone subscriber, at any remote point, to actuate devices located at his particular telephone. No direct connection is made to the telephone line and the system is not dependent upon an audio signal. Consequently, the system is not responsive to noise and imposes no limitation upon the normal use of the telephone line.

SUMMARY OF THE INVENTION

The current change in a telephone line, upon completion of the telephone ringing circuit, is coupled magnetically to a toroidal transformer which produces a series of output voltage pulses. The first pair of output pulses produced by the transformer correspond to the two pre-ring pulses which connect the receiving telephone to the timed ringing circuit when a call is made to the receiving telephone. A second pair of output pulses are produced by the transformer, which pulses corresponding to the start and finish of a telephone ring. The transformer output pulses are applied to a logic circuit which controls the operation of a control circuit. When the second pair of pulses produced by the transformer occur within a predetermined time period which is less than that of a full telephone ring, the logic circuit provides a first actuation of the control circuit. A second telephone call must now be made to the receiving telephone, thereby resulting in a second generation of the two sets of output pulses by the transformer. Under this condition, when the second set of pulses again occur within the predetermined time period, the logic circuit provides a second actuation of the control circuit, which control circuit now effects the energization of an electric device.

2

An object of this invention is the provision of a system for effecting operation of remote devices over a conventional telephone line.

An object of this invention is the provision of a remote control system operable over a telephone line, which system does not require modification of the line and is not responsive to electrical or audible noise.

An object of this invention is the provision of a remote control system for operation of electrical devices located at a receiving station connected to a transmitting station by a telephone line, which system is magnetically coupled to the line at the receiving station.

An object of this invention is the provision of a remote control system coupled to a telephone line by a toroidal transformer and responsive only to voltage pulses falling within a predetermined time period, which pulses are generated in the transformer upon the flow of a ringing current in the line.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF THE PREFERRED EMBODIMENT

Figure 1:
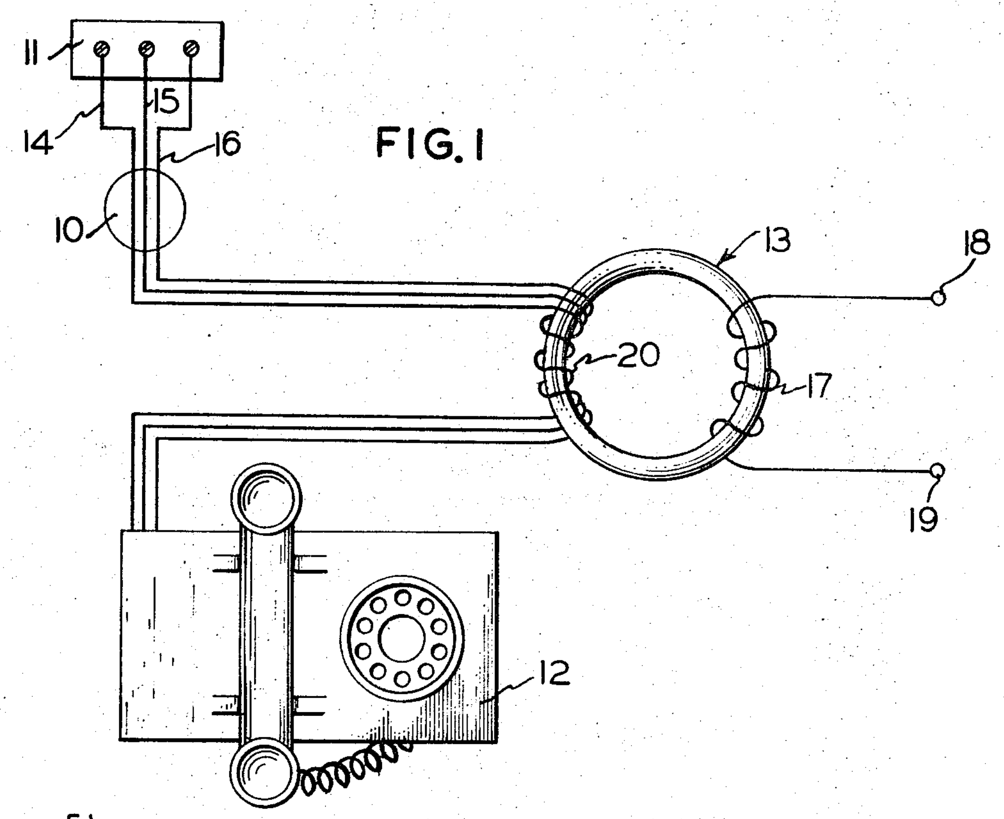
FIG. 1 is a diagram showing the toroidal transformer coupled to a telephone line.

Referring now to FIG. 1, the numeral 10 denotes conventional telephone line connected between a wall terminal block 11 and a telephone receiver 12, which line is wound around the core of a toroidal transformer 13 in accordance with this invention. Such line comprises a ground, of reference wire 14, and two active, or live wires 15 and 16. The secondary winding 17, of the transformer, is connected to the terminals 18 and 19, preferably by twisted leads or a co-axial cable. The input of the logic circuit also is connected to these terminals, as will be described hereinbelow, and the number of turns on the secondary winding will depend upon the voltage sensitivity of the logic circuit.

Under static conditions, that is, when the telephone is quiescent, a D.C. voltage of the order of 40–50 volts normally appears between the wire 14 and the wires 15 and 16. When the telephone rings, this voltage drops to approximately 25 volts due to the current consumption of the telephone ringing circuit. The rate of change of current, *di/dc*, induces a voltage of self induction in the primary 20 and the magnitude of this voltage, is, $$e_L = \frac{di}{dt} \quad (1)$$

where L is the inductance formed by the telephone wires and the core of the transformer.

Normally, since the currents flowing to and from the ringing circuit in the receiver 12 appear in the wires 15, 16 and 14, it would be expected that the resultant induced voltage would be zero. However, because of inequalities in (a), the current magnitudes in the wires 15 and 16 compared to that in the wire 14, (b), phasing or timing of these currents, and (c) the coupling between the wires and the transformer core, a small voltage is induced in the secondary winding 17 by normal transformer action.

The current flowing in the wires 15 and 16, at any instant during a telephone ring is given by the equation, $$i_{15,\,16}=I_m \sin \omega t \tag{2}$$

where $I_m$ is the maximum current amplitude.

Correspondingly, the current flowing in the wire 14 is, $$i_{14}=I_m \sin \omega t \tag{3}$$

The voltage required at any instant to cause such current flow is given by the equations, $$e_{15,\,16}=L_{15,\,16}\frac{di}{dt} \tag{4}$$

and $$e_{14}=L_{14}=\frac{di}{dt}$$

$$=L_{14}\frac{d(I_m \sin \omega t}{dt}$$

$$=\omega L_{14} I_m \cos \omega t \tag{5}$$

Since the primary induced voltage ($e_L$) is the algebraic sum of the voltages given in Equations 4 and 5, it can be seen that in the equation for $e_{14}$, the inductance, current and phase angle must be exactly equal to that for $e_{15,16}$ in order to result in a zero voltage condition in the primary 20.

From Equations 4 and 5, it can be seen that the voltages in the transformer primary and secondary will have maximum values when the rate of change of current with time is a maximum. Since this occurs at the beginning and end of a telephone ring, the voltage induced in the secondary will be a maximum at the start and finish of each ring. The voltage induced in the secondary will be sinusoidal having a period dependent upon the secondary self inductance and secondary shunt capacitance. Such sinusoidal voltage will also be damped due to the $1^2R$ load at the input of the logic circuit, as will be explained hereinbelow. Thus, a damped, sinusoidal waveform will be generated at the start and finish of each telephone ring.

Immediately prior to a telephone ring in a normal telephone, the telephone line engages a ringing circuit which provides the timing cycle for the telephone ring. This timing cycle normally is 2 seconds for the ring period, followed by a 5-second quiescent period, such sequence being repeated until either the phone is answered or the caller hangs up. The engagement of the ringing circuit generates two pulses spaced 0.4 seconds apart and these pulses, arbitrarily designated as the pre-ring pulses, always occur prior to the first ring of the telephone.

Figure 3:
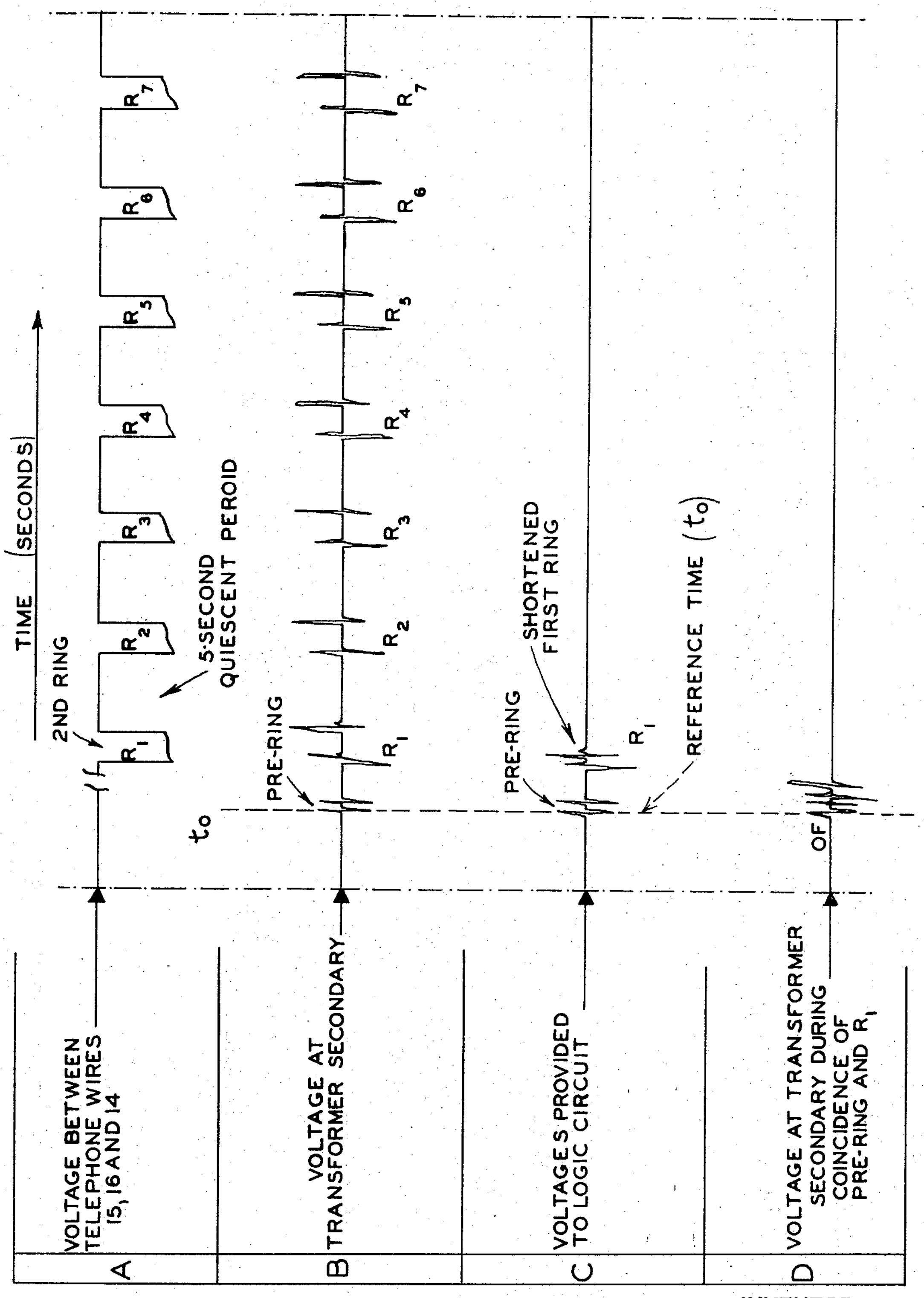
FIG. 3 is a set of timing diagrams showing the voltage pulses induced in the secondary of the toroidal transformer.

The sequence of pulses generated in the toroidal transformer are shown in the timing diagrams of FIG. 3 to which reference now is made. Waveforms A show the change of voltage between the wires 15, 16 and 14 during a normal telephone ring sequence. Waveforms B show the pulses generated in the secondary of the transformer and waveform C shows the pulses provided to the logic circuit of the system. It is here pointed out that the relationship between the waveform A and the reference time $t_0$ is purely random in nature, that is, the waveforms B and C may be displaced in time with respect to waveform A. Thus, a pre-ring may occur during a ring period or during a quiescent period in the ring timing cycle shown in waveform A. In other words, the first ring in the receiver ($R_1$) may occur immediately following the pre-ring or at any time up to four seconds after the pre-ring. If the pre-ring occurs during the 2-second ring time, the ring time will be shortened and ($R_1$), will occur immediately following the pre-ring, as shown in waveform D. Voltage pulses corresponding to waveforms C and D are used to generate the control function of the system as will now be described.

Figure 2:
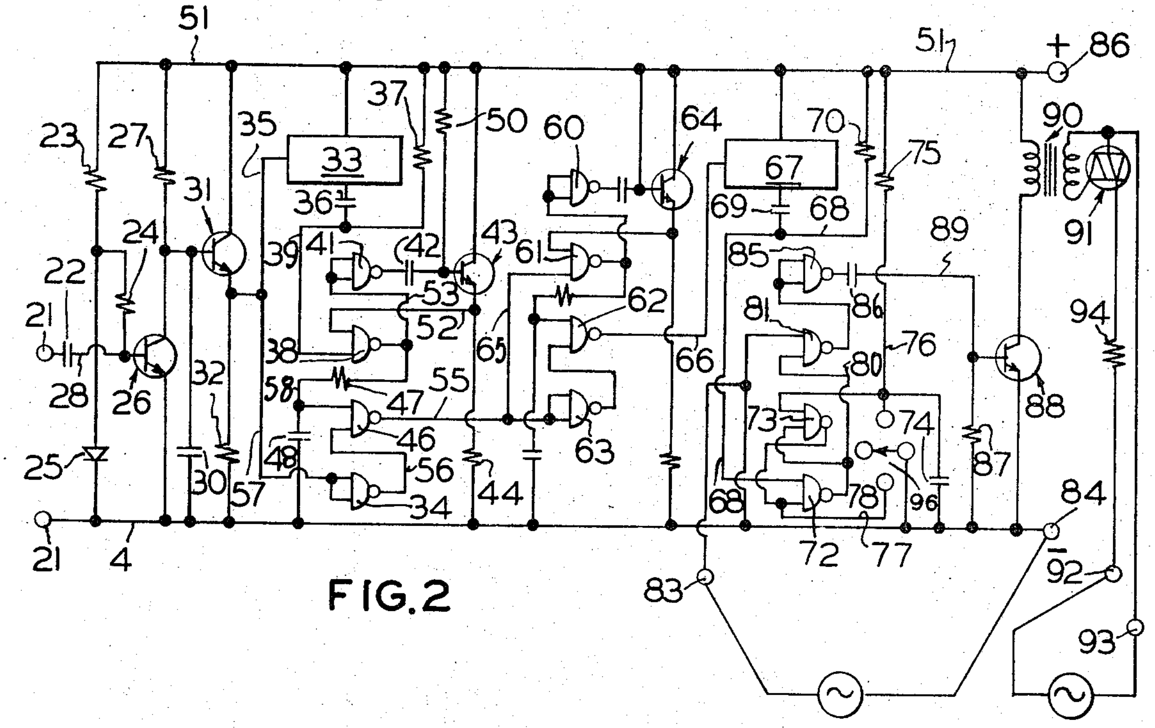
FIG. 2 is a schematic diagram showing the logic circuits and the power control circuit.

Reference is now made to FIG. 2 showing the logic and power control circuits. The secondary of the toroidal transformer is connected to the terminals 21, the input signals appearing across these terminals being shown by waveform A in the timing circuit of FIG. 4. These input signals are applied to a voltage amplifier stage through a capacitor 22, said stage comprising the bias circuit formed by the resistors 23, 24 and diode 25, the transistor 26 and the resistor 27. The voltage gain of this stage is such that each positive excursion of the input signal, in the lead 28, causes the collector of the transistor 26 to saturate, that is, approach a zero voltage level. The capacitor 22 and resistor 24 form a high pass filter for blocking spurious, lower frequencies appearing in the signal source, such as the 60Hz power line frequencies. On the other hand, the capacitor 30 and resistor 27 form a low pass filter which filters out spurious higher frequencies which may appear in the signal source. Together, these filters form a bandpass filter having a bandwidth of 3KHz with a mid-frequency of 1500 Hz.

The output of the described voltage amplifier stage is applied to a power amplifier comprising the transistor 31 and resistor 32. This power amplifier is utilized to convert the high impedance of the preceding amplifier stage, which is approximately 40,000 ohms, to an impedance level of approximately 5,000 ohms, which is sufficiently low to drive the input circuits of a clocked flip-flop 33 and gate 34 connected in the output circuit of the transistor 31. The flip-flop is a dual, in-line, integrated circuit which is commercially available and need not here be described except to point out that it provides a change of state (logic "0" to logic "1" or the reverse) for each negative excursion of the input signal applied thereto. The static input voltage, appearing across the lead 35, is fixed at +2.5 volts by the biasing circuit of transistor 26. Upon receipt of the pre-ring pulses, the output of the power amplifier 31 drops to zero volts, see waveform B, FIG. 4, thereby causing a change of state in the flip-flop. Because of the gating arrangement in the flip-flop, the first pre-ring pulse causes the flip-flop output to change from logic "0" to logic "1," resulting in a voltage change across the capacitor 36 from 0 to 4.0 volts, see waveform C of FIG. 4. Upon receipt of the second pre-ring pulse, the flip-flop output changes from logic "1" to logic "0." This negative going excursion is differentiated by the capacitor 36 and the resistor 37, and the resultant negative pulse is applied to the gate 38 over the wire 39. The differentiated output of the flip-flop is shown in waveform D of FIG. 4.

The gates 38, 41, resistor 50, capacitor 42, transistor 43 and resistor 44, form a one shot multivibrator whose "on" time is controlled by the capacitor 42 and resistor 50. Such "on" time is fixed at 5 seconds, which corresponds to the quiescent period in the ringing circuit timer, see waveform A of FIG. 3. Thus, a positive voltage excursion is generated at the output of the gate 38 which is conveyed to the input of gate 46 through the resistor 47 and capacitor 48, which capacitor and resistor form a 10-millisecond delay circuit.

The action of the one shot multivibrator is as follows. The gates 38 and 41 are dual input Nand gates (positive logic) which perform the logic $$J_{output}=\overline{A_1 \cdot A_2} \tag{6}$$

where J is the output voltage and $A_1$ and $A_2$ are the dual inputs to the gates. This logic form simply means a negative output is obtained if both input $A_1$ and $A_2$ are positive, i.e. positive logic Nand. Conversely, if either input $A_1$ or $A_2$ is negative the output is positive, i.e., negative logic Nor. Under quiescent conditions, the resistor 50 causes the base of the transistor 43 to be at approximately the biasing voltage (5 volts) applied to the lead 51. This makes the emitter and, hence, the input lead 52 to the gate 38, positive. The second input to the gate 38, lead 39, is already positive due to the resistor 37 being connected to the lead 51. Thus, the both inputs to the gate 38 are positive and the output appearing in the lead 53 is negative (0.2 volt). Since the lead 53 is connected to both inputs of the gate 41, the output of this gate is positive and the capacitor 42 holds no charge, both sides of this capacitor being positive under the stated condition. Further, the voltage of the lead 53 being negative, the input to the gate 46 is negative, thus blocking any change in its output lead 55 due to changes in the other input lead 56 (Nor function).

On receipt of a negative, differentiated pulse from the flip-flop 33, over the lead 39, the output of the gate 38 goes positive, thereby causing both inputs to the gate 41 to go positive. Thus, the output of the gate 41 goes negative (Nand function), causing the full voltage on the lead 51 to appear across the capacitor 42. Such capacitor charges up toward the 5-volt level of the lead 51 at a time constant fixed by the capacitor 42 and resistor 50. During this charge time, the base and the emitter of the transistor 43 are negative, causing the input to the gate 38, (lead 52) to become negative (Nor function). Hence, the output of the gate 38 (lead 53) is held positive. This change of state in the output of the gate 38 is maintained for a period of 5 seconds, which is the time required for the charging voltage of the capacitor 42 to reach the threshold voltage of the gate 38. The transistor 43 is employed as an impedance transforming device which isolates the charging circuit, resistor 50 and capacitor 42, from the low impedance of the gate 38. The output of the gate 38 (lead 53) is applied through the resistor 47 and capacitor 48 to one input of the gate 46, which input goes positive at a rate dependent upon the time constant of said capacitor and resistor. This delay circuit delays gate 46 from opening for a period of 10 milliseconds, thereby to allow the second pre-ring pulse to dissipate before gate 46 opens.

The output of the power amplifier 31 is also applied to both inputs of the gate 34 over the lead 57. Under static conditions, these inputs to the gate 34 are positive, causing the output of this gate, appearing in the lead 56, to become negative. Each negative pulse in the lead 57, due to the pre-ring pulses generated in the toroidal transformer by the ringing circuit, causes the output of the gate 34 to go positive. These positive excursions are inhibited by the gate 46 due to the negative input on the lead 58 from the five second, one short multivibrator. However, since the second pre-ring pulse causes this multivibrator to change its output state for a period of five seconds, (see waveform E of FIG. 4), the input pulse on the input lead 58 will be positive for that period of time. Consequently, after both pre-ring pulses have been blocked by the gate 46, this gate opens, thereby allowing all subsequent pulses occuring during that period of time fixed by the 5-second, one shot multivibrator to appear at the output of gate 46, (lead 55). The only pulses which can appear in the lead 55 are those which occur during the 5-second interval when the one shot multivibrator is in changed state condition and such pulses can only be those generated by the first ring of the telephone. Such first ring of the telephone results in the generation of two pulses, one at the start of the ring and one at the finish of the ring, as has been described hereinabove.

The gates 60, 61, 62 and 63 perform functions identical to those already described with reference to gates 41, 38, 46 and 34 except that the time interval generated by the gates 60 and 61, in conjunction with the transistor 64 and its associated circuitry, is 1.5 seconds. The first pulse generated by the first ring of the telephone will appear in the lead 55 and will trigger the one shot multivibrator through the lead 65 (see waveform F of FIG. 4) and will be inhibited by the gates 62 and 63. The second pulse generated by the first telephone ring will pass through the gates 62 and 63 providing this pulse occurs within the 1.5 second time interval after the start of the ring. It is this precise timing of the duration of the first telephone ring which provides the control function of the system. Since the normal telephone ring continues for 2 seconds, the telephone cradle, at the calling station, must be depressed (to open the connection to the receiving station) within 1.5 seconds of the start of the first telephone ring to ensure that the finish pulse gets through the gate 62 while such gate is still open. If, as sometimes happens due to the random nature of the telephone rings with respect to the pre-ring pulses, the first ring is short, then the telephone at the calling station can be cradled at any time. It is the shortening of the first ring which separates a normal telephone call from a call which is intended to initiate a control function.

The finish pulse of a first shortened telephone ring is applied, through the lead 66, to a second clock flip-flop 67, the output of which performs the same change of state function as the flip-flop 33. Specifically, on receipt of the finish pulse from the first telephone ring, the flip-flop 67 changes its output stage from logic "0" to logic "1" corresponding to a voltage output charge of 0.2 volt to 4 volts.

A second telephone call made to the receiving station will cause the above-described logic circuit to perform the same functions a second time, providing a second pulse on the lead 66 to cause the flip-flop 67 to return to its initial state, that is, change from logic "1" (4 volts) to logic "0" (0.2 volt). The second change of state of this flip-flop results in the generation of a negative pulse in the lead 68 due to the differentiation of the flip-flop output by the capacitor 69 and resistor 70. This pulse is applied to one of the inputs of the gate 72. The gates 72 and 73, working in conjunction with each other form an RS (reset-set) flip-flop, such flip-flop requiring two inputs to separate points to cause a single output pulse, whereas the flip-flops 33 and 67 require two inputs to the same point to cause a single output.

The RS flip-flop 67 operates as follows. On "switch on" capacitor 74 charges up through the resistor 75 causing the voltage of the lead 76 to increase slowly in a positive direction from ground. This causes the lead 76 to be more negative than the lead 68 making the output of the gate 73 (lead 77) go positive. With the leads 68 and 77 both positive, the output of gate 72 (lead 78) goes negative (Nor function). Under these conditions, the lead 77 is positive and the lead 78 is negative and, thus, the flip-flop 67 is in the reset condition.

Upon the appearance of a negative pulse in the lead 68, the output of gate 72 (lead 78) goes positive, thereby causing the output of gate 73 to go negative. In this condition, the RS flip-flop is in its "set" condition. Any further pulses appearing in the lead 68 will not change this condition. Thus, it will be apparent that the RS flip-flop is actuated to the "set" condition after two telephone calls whose first rings have terminated within 1.5 seconds. In this "set" condition of the RS flip-flop, the input lead 80 to the gate 81 will go positive, thereby opening this gate and allowing 120 Hz. pulses, (which are applied to the input terminals 83 and 84) to appear at the output of gate 81. The output of gate 81 is applied to the gate 85, which gate inverts the output from gate 81 and supplies output pulses of square waveform and having a MARK-SPACE ratio of 1:1. These square wave pulses are differentiated by the capacitor 86 and resistor 87, thereby resulting in the application of a series of pulses, at a 120-Hz. rate, to the transistor 88, see waveform L, FIG. 4. This transistor is a pulse amplifier which amplifies the positive pulses appearing in the lead 89 to cause saturation of the transistor. When the transistor is saturated, a relatively large current flows through the primary of a pulse transformer 90, thereby causing 4-volt pulses to appear in the secondary, which pulses occur at 120-Hz. rate.

The output pulses from the pulse transformer are applied between the gate and one of the anodes of a Triac 91, causing the Triac to conduct during each half cycle of the 115-volt, 60-Hz. power line voltage applied to the terminals 92 and 93. The load 94, which may be any electrical device, is connected in series across the terminals 92 and 93 when the Triac conducts, whereby the full power line voltage is applied thereto. Thus, the main function of the system has been performed. Specifically, power has been applied to the load upon making two telephone calls, the first ring of each such call being shorter than normal.

Figure 4:
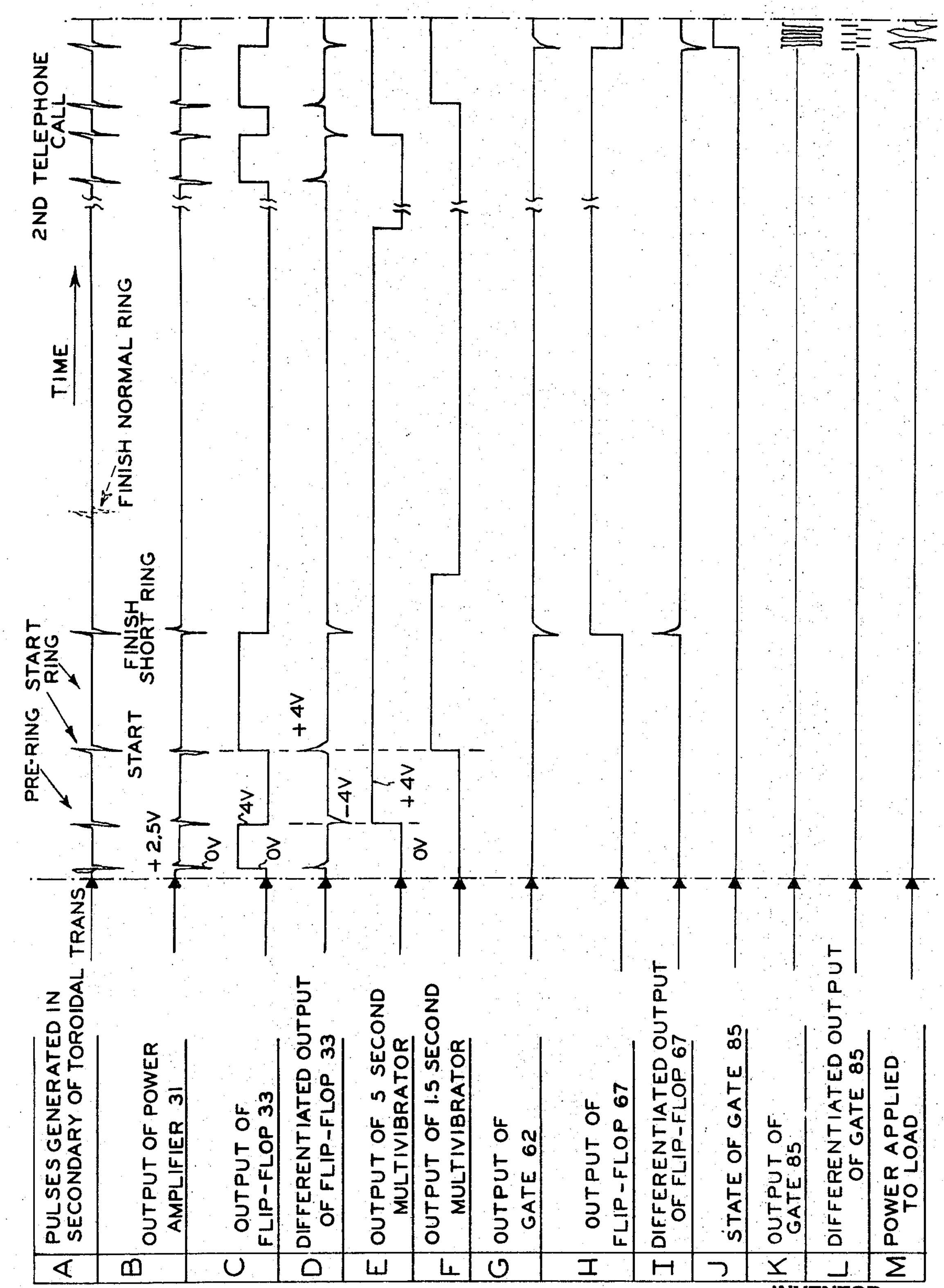
FIG. 4 is a set of timing diagrams showing the operation of the logic and control circuits.

The operation of the system may now be summarized briefly, with reference to FIG. 4 wherein the reference numerals denote the components having like numerals in FIG. 2. The pulses shown in waveform A are generated in the secondary of the toroidal transformer when a call is made to the receiving station. The two pre-ring pulses connect the receiver to the timed ringing circuit providing a 2-second ring period followed by a 5-second quiescent period. In waveform A, it is assumed the first full ring starts sometime after the second pre-ring pulse and such ring would normally extend between the two pulses identified by the legends START and FINISH NORMAL RING. The pulses shown in waveform A are amplified by the power amplifier 31, waveform B, and are applied to the clocked flip-flop 33. Each negative going pulse applied to the flip-flop causes it to change its state, thereby resulting in a flip-flop output as shown in waveform C. The differentiated output of this flip-flop, waveform D, is applied to the 5-second, one shot multivibrator. The negative going pulse, corresponding to the second prering pulse, causes the multivibrator to change its state, thereby providing an output voltage for precisely 5 seconds, waveform E. The output of the power amplifier also is applied to the 1.5-second one shot multivibrator but only during the 5-second time period that the first multivibrator is producing an output. Thus, the amplified, positive-going pulse, corresponding to pulse generated at the start of the first full ring of the telephone, causes the 1.5-second multivibrator to change its state, thereby providing an output voltage for precisely 1.5 seconds, waveform F.

If the first ring of the telephone is allowed to continue for the full 2 seconds, it will be apparent that the pulse generated at the finish of such ring will not occur within the 1.5-second time period that the 1.5-second multivibrator is in the state wherein it produces an output. Under this condition, the system will not perform the intended function and the load will not be energized. If, however, the telephone ring is shortened, as by cradling the transmitting telephone, so that the pulse at the finish of such shortened ring occurs during the 1.5-second period defined by the 1.5-second multivibrator, such pulse is transmitted to the gate 62. This gate produces a negative output pulse, waveform G, which causes a change of state in the clocked flip-flop 67, said flip-flop producing an output voltage as shown in waveform H. The system now is conditioned for the reception of a second series of pulses generated upon making a second call to the receiving station.

When the second call is made to the receiving station, the waveforms A–G are repeated, provided the first ring of this call also is shortened, as by cradling the transmitting telephone. Now, however, the negative output pulse of gate 62, waveform G causes the flip-flop 67 to return to its original state. The output of this flip-flop is differentiated, waveform I, and the second (negative-going) pulse causes the gate 85 to open, waveform J. The 120-Hz. pulses now appear at the output of gate 85, waveform K, which pulses are differentiated, waveform L, and applied through the output transistor 88 to the Triac, thereby applying power to the load 94, waveform M.

If, upon making the first or the second call to the receiving station, the first telephone ring is of shorter than normal duration (a condition which is apparent to the caller) then the transmitting telephone can be cradled at any time as such shortened pulses will actuate the control system.

The description given above explains only the "switching on" of the system. However, those skilled in this art will understand that if the RS flip-flop is replaced by a clocked flip-flop a repetition of the above-described functioning of the system can be effected. More specifically, a further two telephone calls will cause the additional flip-flop to reset, thereby switching off the power to the load. As an additional safeguard against inadverent "switching on" of the system, a 1.5-minute timer may be utilized to reset the system to its quiescent state if the second telephone call is not forthcoming within that time period.

Shown in FIG. 2 is a manually operable switch 96. When this switch is set in the illustrated position, the system will function as described hereinabove. When the movable arm of the switch is set into engagement with the upper stationary contact, the RS flip-flop is actuated to the "set" position and power is applied to the load, whereas when the switch arm is set into engagement with the lower stationary contact, the RS flip-flop is actuated to the "reset" position, therby removing power from the load.

Having now described the invention, those skilled in this art will be able to make various changes and modifications without thereby departing from the spirit and scope of the invention as recited in the following claims.

What is claimed is:

1. In a control system of the class which responds to the ringing of a telephone to effect operation of an electrical device; the improvement wherein the system is magnetically coupled to the telephone line by means producing voltage pulses corresponding to the start and finish of a telephone ring, and wherein the means effecting operation of the electrical device is actuated only when the said voltage pulses occur within a predetermined time period, which period is less than that of a full telephone ring.

2. A system for controlling an electrical device in response to the flow of ringing current in a telephone line, which system comprises, (a) means magnetically coupled to the ringing leads of the telephone line and producing first and second voltage pulses corresponding respectively to the start and finish of a telephone ring,
(b) first switching means normally in a first state,
(c) circuit elements applying the said first voltage pulse to the first switching means and thereby placing the switching means in a second state,
(d) means maintaining the first switching means in the second state for a predetermined time period, which period is shorter than that of a full ring of the telephone,
(e) second switching means normally in a first state,
(f) circuit elements applying the second voltage pulse to the second switching means only when such pulse occurs during the period when the first switching means is in the second state, said second voltage pulse placing the second switching means in a second state, and
(g) control means connecting the said electrical device to a source of voltage when the second switching means is in the second state.

3. The invention as recited in claim 1 in combination with a normally-open switch, and a resetting circuit, said resetting circuit being effective upon closure of said switch to return the second switching means to its first state.

4. A system for controlling a remote electrical device by means of the ringing circuit of a conventional telephone line, in which circuit two pre-ring voltage pulses occur prior to the first ring of the telephone upon making a call to the receiving station, said system comprising, (a) means magnetically coupled to the ringing circuit leads and providing first and second output voltage pulses corresponding to the pre-ring pulses and third and fourth output voltage pulses corresponding respectively to the start and finish of a telephone ring,
(b) means applying the said output voltage pulses to a first gating means which changes from one to another state upon the application of each voltage pulse thereto,
(c) a first switching means having a normal first state,
(d) means actuating the first switching means to a second state upon a second change of state of said first gating means,
(e) means maintaining said first switching means in the second state for a time period longer than that of a full telephone ring,
(f) a second switching means having a normal first state,
(g) means actuating the second switching means to a second state upon a third change of state of the said first gating means,
(h) means maintaining said second switching means in the second state for a time period shorter than that of a full ring of the telephone,
(i) a third switching means having a normal first state,
(j) means actuating the third switching means to a second position upon a fourth change of state of the said first gating means, when such fourth state occurs during the time period when said second switching means is in the second state,
(k) means preventing a further change of state of said first gating means during a first call made to the receiving station,
(l) means returning the said third switching means to its normal first state upon a fourth change of state of the first gating means effected by a second telephone call made to the receiving station,
(m) control means actuated upon the return of the third switching means to its normal state, and
(n) means connecting the said electrical device to a source of voltage upon actuation of said control means.

5. The invention as recited in claim 4, including a switch and means effective upon operation of said switch to open said control means.

6. The invention as recited in claim 5, wherein the said control means comprises a normally-closed second gating means which transfers to open condition upon return of the third switching means to its normal state; a source of alternating voltage; a pulse amplifier; means applying said alternating voltage to the input circuit of said amplifier through a capacitor and a resistor when said second gating means is in open condition; a pulse transformer having a primary connected in the output circuit of said amplifier; a Triac connected in series with the said electrical device; and circuit elements connecting the secondary of said transformer between the gate and an anode of the Triac.

7. The invention as recited in claim 4, wherein the said means magnetically coupled to the ringing circuit leads is a toroidal transformer having a secondary, the primary of the transformer being formed by a plurality of turns of the ringing circuit leads wound about the transformer core.

8. The invention as recited in claim 7, including a first capacitor and a first resistor connected in series and across the secondary winding; a voltage amplifier stage having an input circuit connected between one end of the transformer secondary and the common junction of said first capacitor and resistor; a power amplifier having an input circuit connected to the output circuit of said amplifier stage; a second capacitor connected across the input circuit of the power amplifier; a second resistor connected across input and signal common electrodes of said power amplifier; and means applying the output of the power amplifier to the said first gating means, the said capacitors and resistors forming a band-pass filter tuned to approximately 1500 Hz. and having a bandwidth of approximately 3 kHz.

9. The invention as recited in claim 8, wherein the output of the power amplifier is applied to said first gating means through a clocked flip-flop, and including means differentiating the output from said flip-flop.

References Cited

UNITED STATES PATENTS

| | | | |
|---|---|---|---|
| 3,254,159 | 5/1966 | Condict | 179—41 |
| 3,360,777 | 12/1967 | Kolm | 340—164 |

KATHLEEN H. CLAFFY, Primary Examiner
D. L. STEWART, Assistant Examiner